(12) United States Patent
Naito

(10) Patent No.: US 6,600,646 B1
(45) Date of Patent: Jul. 29, 2003

(54) NIOBIUM POWDER, SINTERED BODY THEREOF AND CAPACITOR USING SAME

(75) Inventor: Kazumi Naito, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 144 days.

(21) Appl. No.: 09/636,638

(22) Filed: Aug. 11, 2000

Related U.S. Application Data

(60) Provisional application No. 60/148,265, filed on Aug. 11, 1999.

(51) Int. Cl.⁷ .................................................. H01G 9/04
(52) U.S. Cl. .................... 361/508; 361/509; 361/306.1; 361/321; 361/311; 361/523
(58) Field of Search .............................. 361/508, 306.1, 361/321, 303, 305, 528, 311, 504, 509, 523, 511, 512; 75/369

(56) References Cited

U.S. PATENT DOCUMENTS

| | | | | |
|---|---|---|---|---|
| 5,284,639 A | * | 2/1994 | Sommers et al. | 423/344 |
| 5,448,447 A | * | 9/1995 | Chang | 361/529 |
| 6,051,044 A | * | 4/2000 | Fife | 75/229 |
| 6,115,235 A | * | 9/2000 | Naito | 361/303 |
| 6,136,062 A | * | 10/2000 | Loffelholz et al. | 75/369 |
| 6,165,623 A | * | 12/2000 | Fife et al. | 428/472 |
| 6,171,363 B1 | * | 1/2001 | Shekhter et al. | 75/369 |

FOREIGN PATENT DOCUMENTS

| | | | |
|---|---|---|---|
| JP | WO98/38660 | * | 2/1998 |
| WO | WO 98/19811 | | 5/1998 |

OTHER PUBLICATIONS

Abstract and first page of JP A H1–167206, Pub. date Jun. 30, 1989, "Production of Noibium Nitride", F. Takao et al.

* cited by examiner

Primary Examiner—Hung V. Ngo
Assistant Examiner—Nguyen Ha
(74) Attorney, Agent, or Firm—Sughrue Mion, PLLC

(57) ABSTRACT

A niobium powder having a nitrogen content of at least about 500 ppm by weight and not more than about 7,000 ppm by weight, and having a mean particle diameter of at least about 0.2 μm and less than about 3 μm. A sintered body of the niobium powder. This sintered body generally has a specific leakage current index of not more than about 400 [pA/(μF·V)]. The capacitor having (i) the sintered body as one electrode, (ii) a dielectric formed on the sintered body, and (iii) the other electrode exhibits good leakage current characteristics.

16 Claims, No Drawings

NIOBIUM POWDER, SINTERED BODY THEREOF AND CAPACITOR USING SAME

CROSS-REFERENCE TO RELATED APPLICATION

This application is an application filed under 35 U.S.C. §111(a) claiming benefit pursuant to 35 U.S.C. §119(e)(1) of the filing date of Provisional Application 60/148,265 filed Aug. 11, 1999, pursuant to 35 U.S.C. §111(b).

BACKGROUND OF THE INVENTION (1) Field of the Invention

This invention relates to a niobium powder used for a capacitor having excellent leakage current characteristics; a sintered body produced from the niobium powder; and a capacitor having the sintered body.

(2) Description of the Related Art

Capacitors to be incorporated in electronic apparatuses such as portable phones and personal computers are demanded to have a small size and a high capacitance. Among such capacitors, a tantalum capacitor has been widely used, in view of high capacitance relative to its size, and excellent performance. Generally, in the tantalum capacitor, a sintered body of tantalum powder is used as a positive electrode, and therefore in order to increase the capacitance of the capacitor, the weight of the sintered body must be increased.

When the weight of the sintered body is increased, the capacitor necessarily becomes larger in size and fails to satisfy the demand for a small-sized capacitor. In order to solve this problem, a capacitor containing a sintered body of a powdery material having a dielectric constant higher than that of tantalum has been studied. Niobium and titanium are mentioned as examples of the powdery material having a high dielectric constant.

However, a sintered body of the above-described material has a high specific leakage current index. Since niobium and titanium have high dielectric constants, a capacitor having high capacitance can be produced from these materials, but lower specific leakage current index is required in order to produce a capacitor of high reliability. Specific leakage current index, i.e., leakage current per unit capacitance, can be used to evaluate whether high capacitance can be obtained while maintaining leakage current at a practically permissible low level.

The specific leakage current index is determined as follows. A sintered body having a dielectric layer formed thereon by electrolytic oxidation is prepared, and 70% of formation voltage is continuously applied to the sintered body for three minutes. The leakage current during the application of voltage is divided by the product of formation voltage during electrolytic oxidation and capacitance of the sintered body. Thus, the specific leakage current index is expressed by the following formula:

$$\text{specific leakage current index} = [LC/(C \times V)]$$

wherein LC: leakage current, C: capacitance and V: formation voltage.

In the case of a sintered body of a tantalum powder, a specific leakage current index is not more than 1,500 [pA/($\mu$F·V)], as calculated from capacitance and leakage current described in a catalogue entitled "CAPACITOR GRADE TANTALUM" by Showa Cabot Supermetals K.K. In order to guarantee this value, it is generally accepted that the actual measured value of specific leakage current index must be at most $\frac{1}{3}$ to $\frac{1}{4}$ of the value calculated from the catalogue, and a preferred leak current index is not more than 400 [pA/($\mu$F·V)]. However, a conventional sintered body of niobium or titanium powder has a specific leakage current index much higher than the preferred leak current index, and thus a capacitor containing the sintered body of niobium or titanium has poor reliability and is impractical for use.

SUMMARY OF THE INVENTION

In view of the foregoing, an object of the present invention is to provide a niobium powder suitable for the production of a capacitor having a low specific leakage current index.

Another object of the present invention is to provide a sintered body of niobium powder, used for a capacitor having a low specific leakage current index.

A further object of the present invention is to provide a capacitor with a low specific leakage current index, which has an electrode composed of a sintered body of niobium powder.

In a first aspect of the present invention, there is provided a niobium powder having a degree of nitridation represented by a nitrogen content (hereinafter referred to as "nitrogen content") of at least about 500 ppm by weight and not more than about 7,000 ppm by weight and having a mean particle diameter of at least about 0.2 $\mu$m and smaller than about 3 $\mu$m.

In a second aspect of the present invention, there is provided a sintered body produced from a niobium powder, which exhibits a specific leakage current index of not more than about 400 [pA/($\mu$F·V)].

In a third aspect of the present invention, there is provided a sintered body produced from the niobium powder concerned with the first aspect of the present invention.

In a fourth aspect of the present invention, there is provided a capacitor comprising the capacitor concerned with the second or third aspect of the present invention, as one electrode, a dielectric formed on the sintered body, and the other electrode.

DESCRIPTION OF THE PREFERRED EMBODIMENTS

The niobium powder of the present invention is characterized as having a nitrogen content of at least about 500 ppm by weight and not more than about 7,000 ppm by weight and having a mean particle diameter of at least about 0.2 $\mu$m and smaller than about 3 $\mu$m. A capacitor produced from the niobium powder exhibits a very low specific leakage current index.

The reason for which the capacitor of the niobium powder exhibits a very low specific leakage current index is inferred below.

Generally, capacitance of a capacitor is represented by the following formula:

$$C = \epsilon \times (S/d)$$

wherein C: capacitance, $\epsilon$: dielectric constant, S: specific surface area and d: distance between electrodes.

In the above expression, since d=k×V (k: constant and V: formation voltage), C is represented by the following formula:

$$C = \epsilon \times [S/(k \times V)], \text{ and thus, } C \times V = (\epsilon/k) \times S.$$

When specific leakage current index is defined by the following formula as hereinbefore mentioned.

specific leakage current index=[$LC/(C \times V)$]

(LC: leakage current), the specific leakage current index [$LC/(C \times V)$] can be expressed by the following formula:

specific leakage current index=$LC/[(\epsilon/k) \times S]$.

In consideration of the above formulas, in order to decrease specific leakage current index, there may be selected any measure from among decreasing leakage current (LC), increasing (C×V), increasing $\epsilon$, and increasing S.

In the present invention, the niobium powder of the present invention has a mean particle diameter of smaller than about 3 μm, the specific surface area of the powder is large. Consequently, the (C×V) value, which is the denominator in the above-described formula providing specific leakage current index, is large. However, when the mean particle diameter of the niobium powder is smaller than about 0.2 μm, a sintered body produced from the niobium powder has a problem such that permeation of a negative electrode material into the sintered body becomes difficult. As a result, capacitance of the produced capacitor cannot be increased to the desired extent, and the (C×V) value cannot be made large, so that the sintered body is unsuitable for practical use.

Meanwhile, niobium may be bonded more strongly with oxygen than may tantalum, and thus, oxygen atoms in an electrolytic-oxidized film formed on niobium tend to diffuse toward the interior metal, i.e., niobium. In contrast, in the sintered body according to the present invention, a niobium powder is partially bonded with nitrogen, and thus oxygen in an electrolytic-oxidized film formed on niobium is hardly bonded with niobium, preventing diffusion of oxygen atoms toward the niobium. Consequently, the oxidized film can be stabilized and leakage current (LC) may be decreased.

In addition, since the niobium powder according to the present invention comprises a nitrogen content of at least about 500 ppm by weight and not more than about 7,000 ppm by weight, leakage current, serving as the numerator of the above-described formula, becomes especially low. Therefore, specific leakage current index of the sintered body according to the present invention may become particularly low.

As is described above, the sintered body of the present invention has a satisfactory specific leakage current index as low as not more than about 400 [pA/(μF·V)]. Furthermore, in the present invention, when a nitrogen content in the niobium powder and the mean particle diameter of the niobium powder are optimized, the specific leakage current index may become not more than about 200 [pA/(μF·V)].

A niobium powder having a mean particle diameter of at least about 0.2 μm and less than about 3 μm serves as a raw material for forming the sintered body. In order to decrease the specific leakage current index, the mean particle diameter is more preferably at least about 0.5 μm and less than about 2 μm. If the mean particle diameter is less than about 0.2 μm, when a capacitor is fabricated from a sintered body produced from the niobium powder, a negative electrode material described below becomes difficult to soak into the sintered body because pores in the sintered body become very small. In contrast, if the mean particle diameter is about 3 μm or larger, the sintered body having a desirable specific leakage current index is difficult to obtain. As used herein, in the case of the niobium powder, the term "mean particle diameter" refers to $D_{50}$ value, i.e., particle diameter value having a cumulative weight % of 50, which is measured by a particle size distribution measurement apparatus (commercial name, Microtrac).

The niobium powder having the above-described mean particle diameter can be produced by means of, for example, pulverization of a sodium-reduced compound of potassium fluoroniobate, pulverization of a hydrogenated niobium ingot followed by dehydrogenation, or carbon-reduction of niobium oxide. The mean particle diameter of niobium powder can be controlled, for example, by the degree of hydrogenation of a niobium ingot, the pulverization time, and pulverization apparatus, when the niobium powder is obtained by pulverization of hydrogenated niobium ingot followed by dehydrogenation.

The thus-obtained niobium powder may contain impurities attributed to the raw material, the reducing agent, and the apparatus employed. Typical impurities are elements M, which include iron, nickel, cobalt, silicon, sodium, potassium, and magnesium. The above-described niobium powder may be washed with an alkali and at least one acid selected from hydrofluoric acid, nitric acid, sulfuric acid and hydrochloric acid. Alternatively, the niobium powder may be washed with the above acid, an alkali, and aqueous hydrogen peroxide. These reagents may be used sequentially or in combination, so as to wash the niobium powder repeatedly for removal of impurities. More specifically, the niobium powder may be sufficiently washed, for example, with sulfuric acid, and residual sulfuric acid may be neutralized by use of an alkali, after which, the niobium powder may be repeatedly washed with water. When nitric acid is used together with hydrogen peroxide for washing the niobium powder, oxidation of the powder by nitric acid can be advantageously prevented. The niobium powder may also be washed by means of another method; for example, the niobium powder is stirred in the above-described reagents for an appropriate period of time, i.e., until the impurity content reaches a predetermined value or less, and the powder is separated from the reagent with stirring.

In the present invention, impurity content of the niobium powder should preferably be reduced as low as possible. Generally, impurity content on the surface of a powder increases in accordance with the surface area, and therefore, in the above-described formula for calculating "specific leakage current index," "leakage current (LC)" serving as the numerator tends to become larger than "(C×V)" serving as the denominator. However, in the present invention, by suppression of impurity content, an increase of "(C×V)" serving as the denominator can become larger in relation to "leakage current (LC)" serving as the numerator, as compared with typical cases.

When the niobium powder containing the element M as an impurity is used for producing a capacitor, the element M may migrate into a dielectric layer. Therefore, when voltage is applied to the capacitor, the element M may cause abnormal accumulation of electric charge, and specific leakage current index of the capacitor may become larger.

The amount of each of the elements M should preferably be not more than about 100 ppm by weight, or the total amount of the elements M should be not more than about 350 ppm by weight. By reducing the impurity content, a baneful influence on the above-described dielectric layer can be reduced. In order to decrease the specific leakage current index further, the amount of each of the elements M is preferably not more than about 70 ppm by weight, and more preferably not more than about 30 ppm by weight. Also, in order to decrease the specific leakage current index further, the total amount of the elements M is preferably not more than about 300 ppm by weight, and more preferably not more than about 200 ppm by weight.

The niobium powder according to the present invention has the above-described mean particle diameter, and a nitrogen content of at least about 500 ppm and not more than about 7,000 ppm by weight. In order to further reduce the specific leakage current index, the nitrogen content is preferably at least about 1,000 ppm and not more than about 3,000 ppm by weight. When the content is less than about 500 ppm by weight or in excess of about 7,000 ppm by weight, a sintered body having the desired specific leakage current index becomes difficult to obtain. As used herein, nitrogen content refers not to the amount of nitrogen adsorbed onto the niobium powder, but to the amount of nitrogen which has been chemically bound to niobium.

Liquid nitrogen, nitrogen ions, and nitrogen gas may be used as the nitrogen source for nitridation of the niobium powder, and these may be used either alone or as combination of two or more thereof. The niobium powder is preferably subjected to nitridation under a nitrogen gas atmosphere, since a convenient apparatus can be used with easy operation. For example, the niobium powder is allowed to stand under a nitrogen atmosphere, to thereby give a nitrided niobium powder. In this case, the niobium powder is allowed to stand under a nitrogen atmosphere at a temperature of not higher than about 2,000° C. for within several tens of hours, to thereby obtain the niobium powder having the intended nitrogen content. Conducting the nitridation at higher temperature may shorten the time for treatment.

In consideration of lower specific leakage current index, in order to obtain the niobium powder having a nitrogen content in the range of about 500 ppm by weight to about 7,000 ppm by weight, after the particle diameter of niobium powder is measured, nitridation temperature and time can be controlled in relation to the particle size under conditions which are determined by a pre-test.

The procedure by which the niobium powder is sintered is not particularly limited, and the conventional procedure can be employed. For example, the niobium powder is press molded into a predetermined shape, and then maintained at a temperature of about 500° C. to about 2,000° C. under a reduced pressure of about 1 Torr to about $1 \times 10^{-6}$ Torr for several minutes to several hours to give the sintered body.

A capacitor containing the above-described sintered body serving as one electrode, the other electrode, and a dielectric sandwiched by these electrodes may be produced. A preferable example of the dielectric of the capacitor includes niobium oxide. For example, the niobium sintered body serving as one electrode is subjected to electrochemical formation in an electrolytic solution, to thereby form a dielectric composed of niobium oxide on a surface of the sintered body. The electrochemical formation in the electrolytic solution is typically performed by using an aqueous solution of a protic acid, for example, an about 0.1% aqueous solution of phosphoric acid or sulfuric acid. When a niobium oxide dielectric is formed by electrochemical formation of the niobium sintered body in the electrolytic solution, the capacitor according to the present invention serves as an electrolytic capacitor and the niobium sintered body becomes a positive electrode.

No particular limitation is imposed on the material of the other electrode of the capacitor according to the present invention. For example, there may be used at least one compound selected from electrolytic solutions, organic semiconductors and inorganic semiconductors, all of which are publicly known in the aluminum electrolytic capacitor industry. As specific examples of the electrolytic solution, there can be mentioned a mixed solution of dimethylformamide and ethylene glycol having incorporated therein 5% by weight of isobutyltripropylammonium borotetrafluoride, and a mixed solution of propylene carbonate and ethylene glycol having incorporated therein 7% by weight of tetraethylammonium borotetrafluoride. As specific examples of the organic semiconductor, there can be mentioned an organic semiconductor containing benzopyrroline tetramer and chrolanyl, an organic semiconductor predominantly comprising tetrathiotetracene, an organic semiconductor predominantly comprising tetracyanoquinodimethane, and an organic semiconductor predominantly comprising a conductive polymer, which is a polymer represented by the following formula (1) or (2) and has been doped with a dopant. As specific examples of the inorganic semiconductor, there can be mentioned an inorganic semiconductor predominantly comprising lead dioxide or manganese dioxide, and a inorganic semiconductor comprising triiron tetroxide. These semiconductors may be used either alone or as combination of two or more thereof.

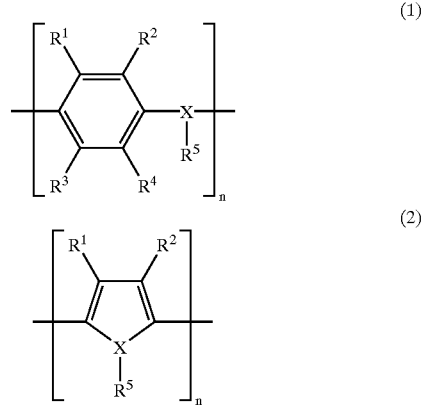

In formulas (1) and (2), $R^1$ to $R^4$ independently represent a hydrogen atom, a $C_1$–$C_6$ alkyl group or a $C_1$–$C_6$ alkoxy group; X represents an oxygen, sulfur or nitrogen atom; $R^5$, which is present only when X is a nitrogen atom, represents a hydrogen atom or a $C_1$–$C_6$ alkyl group; and $R^1$ may be bonded together with $R^2$, and $R^3$ may be bonded together with $R^4$, to form a cyclic structure.

As specific examples of the polymers of formula (1) and (2), there can be mentioned polyaniline, polyoxyphenylene, polyphenylene sulfide, polythiophene, polyfuran, polypyrrole, polymethylpyrrole, and derivatives thereof.

When, as the above-described organic semiconductor and inorganic semiconductor, those having a conductivity of about $10^{-2}$ S·cm$^{-1}$ to about $10^3$ S·cm$^{-1}$ is used, the impedance of the produced capacitor further decreases and the capacitance of the capacitor may be further increased at high frequency.

When the other electrode is in solid form, carbon paste and silver paste may be successively formed on the other electrode and encapsulated with a material such as an epoxy resin, to thereby fabricate a capacitor. The capacitor may have a niobium or tantalum lead, which has been sintered together with the niobium sintered body or welded to the sintered body after sintering. When the other electrode is in liquid form, the capacitor comprising the above-described electrodes and the dielectric may be placed in a can which is electrically connected to the other electrode for the fabrication of a capacitor. In this case, the electrode of the niobium sintered body is led to the outside via the above-described niobium or tantalum lead, and the lead is insulated from the can by a material such as insulating rubber.

As is described above, a sintered body having low specific leakage current index, obtained according to the present invention, may be used for producing a capacitor having low leakage current and high reliability.

The present invention will now be described in more detail by the following working examples.

Characteristics of a niobium powder, a sintered body and a capacitor were determined by the following methods.

(1) Nitrogen Content in Niobium Powder

The amount of nitrogen bound in a nitrided niobium powder was determined based on thermal conductivity of the powder as measured by an oxygen- and nitrogen-measuring apparatus (supplied by LECO). The ratio (unit: ppm by weight) of the amount of bound nitrogen to the separately measured weight of the nitrided powder was regarded the nitrogen content.

(2) Capacitance of Sintered Body

The capacitance of a sintered body was measured by an LCR meter (supplied by HP), which was connected between the sintered body immersed in aqueous 30% sulfuric acid and a tantalum electrode placed in a sulfuric acid solution. The measurement of the capacitance was conducted at 120 Hz and at room temperature.

(3) Leakage Current (LC) of Sintered Body

The leakage current (LC) of a sintered body was measured as follows. DC voltage equivalent to 70% of the electrochemical forming voltage employed during preparation of a dielectric was imposed for three minutes at room temperature between the sintered body immersed in an aqueous 20% solution of phosphoric acid and an electrode placed in an aqueous solution of phosphoric acid. After voltage application, the current was measured as the leakage current of the sintered body. In the present invention, the imposed voltage was 14 V.

(4) Capacitance of Capacitor

A capacitor was formed into a chip, and the capacitance of the chip was measured by an LCR meter (supplied by HP) which was connected between terminals of the chip at room temperature and at 120 Hz.

(5) Leakage Current of Capacitor

The leakage current of a capacitor formed into a chip was measured as follows. DC voltage equivalent to approximately $\frac{1}{3}$ to $\frac{1}{4}$ of the electrochemical forming voltage employed during preparation of a dielectric was selected from rating voltages such as 2.5 V, 4 V, 6.3 V, 10 V, 16 V and 25 V. The selected voltage was applied at room temperature between terminals of the produced chip for one minute. After voltage application, the current was measured as the leakage current of the capacitor formed into a chip. In the present invention, the applied voltage was 6.3 V.

EXAMPLES 1 TO 6 AND COMPARATIVE EXAMPLE 1 TO 3

Potassium fluoroniobate (20 g) which had been thoroughly dried at 80° C. in vacuum, and sodium (amount by mol of ten times that of potassium fluoroniobate) were placed in a nickel crucible, and the mixture was allowed to react for reduction at 1,000° C. for 20 hours under an argon atmosphere. After the completion of reaction, the reaction mixture was cooled, and the thus-reduced product was sequentially washed with water, 95% sulfuric acid, and water, and then dried in vacuum. The dried product was pulverized by a ball mill having an alumina pot and silica-alumina balls contained therein for 40 hours. The pulverized product was immersed in a mixture of 50% nitric acid and 10% hydrogen peroxide (3:2 by weight) with stirring so as to remove an impurity introduced during pulverization. The thus-treated product was thoroughly washed with water such that the pH of wash liquid reached 7, and dried in vacuum, to thereby obtain a niobium powder having a mean particle diameter of 2.6 μm.

The niobium powder was allowed to stand in a vessel filled with nitrogen for two hours at temperatures shown in Table 1, to thereby induce nitridation. Measured nitrogen contents are shown in Table 1.

Subsequently, each of the nitrided niobium powders was shaped together with a niobium wire (0.3 mmφ) into a compact having approximate dimensions of 0.3 cm×0.18 cm×0.45 cm (approximately 0.1 g). The compact was allowed to stand in vacuum of $3 \times 10^{-5}$ Torr at 1,300° C. for 30 minutes, to thereby produce a sintered body thereof. The sintered body was electrochemically converted through application of 20 V in a 0.1% aqueous solution of phosphoric acid at 80° C. for 200 minutes, to thereby form a niobium oxide dielectric layer on a surface of the sintered body. Thereafter, the capacitance in 30% sulfuric acid, and the leakage current (hereinafter referred to as LC when appropriate) after application of voltage at 14 V for three minutes at room temperature in a 20% aqueous solution of phosphoric acid were measured. The results and a specific leakage current index corresponding the LC are shown in Table 1.

EXAMPLES 4 TO 11 AND COMPARATIVE EXAMPLES 4 TO 6

A niobium rod (20 mmφ, 20 g) was placed in a reactor made of SUS 304. After the reactor was degassed to attain vacuum (approximately $6 \times 10^{-4}$ Torr), the temperature of the reactor was elevated to 800° C., and hydrogen was fed into the reactor. Hydrogen was further introduced at 350° C. for 50 hours. After cooling, a hydrogenated niobium ingot was pulverized for 10 hours in a one-liter pot made of SUS 304 and containing iron balls. The pulverized product was placed into the above-described reactor made of SUS 304, and hydrogenated under the same conditions as mentioned above. The thus-formed hydrogenated product was mixed with water, to prepare a 20 vol. % slurry, which was pulverized with zirconia balls by a wet-crusher made of SUS 304 (trade name, Attriter). The pulverizing time was varied as shown in Table 1, to thereby produce a plurality of niobium powders having different mean particle diameters. Each of the niobium powders was sequentially washed with 95% sulfuric acid, water, a mixture of 30% hydrofluoric acid and 50% nitric acid (1:1 by weight), and water, and dried in vacuum, to thereby remove an impurity introduced during pulverization. Nitridation, shaping, and sintering were carried out in the same manner as described in Example 1 or 2, or Comparative Example 1, to thereby produce sintered bodies. In Examples 10 and 11, sintering was carried out at 1,200° C. Conditions for nitridation and the measured nitrogen contents are shown in Table 1. The measured capacitance, LC, and specific leakage current index corresponding the LC are also shown in Table 1.

The amount of each of the elements as impurities contained in niobium powders of Examples 1 to 11 and Comparative Examples 1 to 6 was measured through atomic absorption spectrometry. The results are shown in Table 2.

TABLE 1

| Examples and Comparative Examples | Powder production method | Pulverizing time [hr] | Mean particle diameter [μm] | Nitridation temp. [°C.] | Nitrogen content [wt. ppm] | Capacitance [μF] | LC [μA] | Specific LC index [pA/(μFV)] |
|---|---|---|---|---|---|---|---|---|
| Com. Ex. 1 | A | 40 | 2.6 | 200 | 300 | 225 | 4 | 890 |
| Example 1 | | | 2.6 | 300 | 1000 | 227 | 1.5 | 330 |
| Example 2 | | | 2.6 | 400 | 3000 | 224 | 1 | 220 |
| Example 3 | | | 2.6 | 500 | 7000 | 220 | 1.5 | 340 |
| Com. Ex. 2 | | | 2.6 | 550 | 14000 | 222 | 3 | 680 |
| Com. Ex. 3 | | | 2.6 | 600 | 20000 | 221 | 5 | 1130 |
| Com. Ex. 4 | B | 1 | 3.5 | 200 | 200 | 174 | 8 | 2300 |
| Com. Ex. 5 | | 1 | 3.5 | 300 | 700 | 173 | 3 | 870 |
| Com. Ex. 6 | | 1 | 3.5 | 400 | 2300 | 175 | 2 | 570 |
| Example 4 | | 2 | 1.7 | 200 | 600 | 310 | 2 | 320 |
| Example 5 | | 2 | 1.7 | 300 | 1800 | 308 | 1 | 160 |
| Example 6 | | 2 | 1.7 | 400 | 4500 | 306 | 2 | 330 |
| Example 7 | | 3 | 1.1 | 200 | 1100 | 450 | 1 | 110 |
| Example 8 | | 3 | 1.1 | 300 | 1900 | 448 | 1 | 110 |
| Example 9 | | 3 | 1.1 | 400 | 5800 | 454 | 2 | 220 |
| Example 10 | | 5 | 0.7 | 300 | 3000 | 590 | 2 | 170 |
| Example 11 | | 18 | 0.2 | 300 | 3800 | 970 | 3 | 150 |

Note,
A: Pulverization of reduction product of potassium fluoroniobate
B: Pulverization of hydride of niobium ingot

TABLE 2

| | Content of impurity element [wt. ppm] | | | | | | | |
|---|---|---|---|---|---|---|---|---|
| | Fe | Ni | Co | Si | Na | K | Mg | Total |
| Com. Ex. 1 | 50 | 50 | 20 | 60 | 20 | 50 | 20 | 270 |
| Example 1 | 50 | 50 | 20 | 60 | 20 | 50 | 20 | 270 |
| Example 2 | 50 | 50 | 20 | 60 | 20 | 50 | 20 | 270 |
| Example 3 | 50 | 50 | 20 | 60 | 20 | 50 | 20 | 270 |
| Com. Ex. 2 | 50 | 50 | 20 | 60 | 20 | 50 | 20 | 270 |
| Com. Ex. 3 | 50 | 50 | 20 | 60 | 20 | 50 | 20 | 270 |
| Com. Ex. 4 | 20 | 20 | 15 | 30 | 5 | 5 | 5 | 100 |
| Com. Ex. 5 | 20 | 20 | 15 | 30 | 5 | 5 | 5 | 100 |
| Com. Ex. 6 | 20 | 20 | 15 | 30 | 5 | 5 | 5 | 100 |
| Example 4 | 20 | 20 | 20 | 30 | 5 | 5 | 5 | 105 |
| Example 5 | 20 | 20 | 20 | 30 | 5 | 5 | 5 | 105 |
| Example 6 | 20 | 20 | 20 | 30 | 5 | 5 | 5 | 105 |
| Example 7 | 20 | 20 | 20 | 30 | 5 | 5 | 5 | 105 |
| Example 8 | 20 | 20 | 20 | 30 | 5 | 5 | 5 | 105 |
| Example 9 | 20 | 20 | 20 | 30 | 5 | 5 | 5 | 105 |
| Example 10 | 30 | 30 | 20 | 30 | 5 | 5 | 5 | 125 |
| Example 11 | 35 | 35 | 20 | 30 | 5 | 5 | 5 | 135 |

EXAMPLES 12 TO 14 AND COMPARATIVE EXAMPLES 7 TO 9

The procedures of Examples 1 to 3 and Comparative Examples 1 to 3 were repeated in Examples 12 to 14 and Comparative Examples 7 to 9, respectively, to thereby prepare 50 sintered bodies for each of the working examples. Each of the sintered bodies was electrochemically converted at 20 V in a 0.1% aqueous solution of phosphoric acid for 200 minutes, to thereby form a dielectric niobium oxide film on the surface of the sintered body. Subsequently, the thus-treated sintered body was immersed in an aqueous solution of manganese nitrate and heated at 220° C. for 30 minutes. This immersion-heating procedure was repeated, to thereby form on the dielectric niobium oxide film a manganese dioxide layer as the other electrode. A carbon layer and a silver paste layer were successively formed on the manganese dioxide layer. Then a lead frame was placed on the thus-produced element, and the entirety of the element was encapsulated with an epoxy resin, to thereby produce a chip capacitor.

Capacitance and LC value of capacitor (average value of 50 capacitors) are shown in Table 3. The LC value was measured after 6.3 V was imposed for one minute at room temperature.

EXAMPLES 15 TO 17 AND COMPARATIVE EXAMPLE 10

The procedures of Comparative Example 5 and Examples 9 to 11 were repeated in Comparative Example 10 and Examples 15 to 17, respectively, to thereby prepare 50 sintered bodies for each of the working examples. Each sintered body was treated in a manner similar to that described in Example 12, to thereby form a dielectric niobium oxide film on a surface of the sintered body. Subsequently, the thus-treated sintered body was immersed in a mixture of a 35% aqueous solution of lead acetate and a 35% aqueous solution of ammonium persulfate (1:1 by volume) and heated at 40° C. for one hour. This immersion-heating procedure was repeated, to thereby form on the dielectric niobium oxide film a layer comprising a lead dioxide-lead sulfate mixture (lead dioxide content of 94 wt. %), serving as the other electrode. A carbon layer and a silver paste layer were successively formed on the lead dioxide-lead sulfate mixture layer. A lead frame was placed on the thus-produced element, and the entirety thereof was encapsulated with an epoxy resin, to thereby produce a chip capacitor.

Capacitance and LC value of capacitor (average value of 50 capacitors) are shown in Table 3. The LC value was measured after 6.3 V was imposed for one minute at room temperature.

TABLE 3

| | Sintered body | Capacitor chip | |
|---|---|---|---|
| | Specific LC index [pA/(μF · V)] | LC [μA] | Capacitance [μF] |
| Com. Ex. 7 | 890 | 18.9 | 210 |
| Example 12 | 330 | 1.0 | 212 |
| Example 13 | 220 | 0.9 | 208 |

TABLE 3-continued

|  | Sintered body | Capacitor chip | |
|---|---|---|---|
|  | Specific LC index [pA/(μF · V)] | LC [μA] | Capacitance [μF] |
| Example 14 | 340 | 1.1 | 205 |
| Com. Ex. 8 | 680 | 17.6 | 218 |
| Com. Ex. 9 | 1,130 | 34.2 | 206 |
| Com. Ex. 10 | 870 | 15.0 | 151 |
| Example 15 | 220 | 1.6 | 411 |
| Example 16 | 170 | 2.3 | 526 |
| Example 17 | 150 | 3.5 | 809 |

From comparison of Examples 1 to 3 with Comparative Examples 1 to 3, comparison of Examples 4 to 6, Examples 7 to 9, Example 10 and Example 11 with Comparative Example 4 to 6, in Table 1, it will be seen that sintered bodies produced from niobium powder having a nitrogen content of 500 to 7,000 ppm by weight and a mean particle diameter of at least 0.2 μm and less than 3 μm have an excellent specific LC index. As is clear from Table 3, the LC of a chip capacitor is smaller when the specific LC index of a sintered body is not more than 400 [pA/(μF·V)]. Since the chip capacitor of the present invention has a specific LC index not greater than a generally acceptable value, i.e., 0.01× capacitance×applied voltage, the capacitor is considerably reliable.

Thus, a sintered body comprising the niobium powder of the present invention has an excellent specific LC index, and a capacitor produced from the sintered body has a small LC and serves as a considerably reliable capacitor.

What is claimed is:

1. A niobium powder having a nitrogen content of at least about 500 ppm by weight and not more than about 7,000 ppm by weight, and having a mean particle diameter of at least about 0.2 μm and less than about 3 μm, which contains as impurity at least one element M selected from the group consisting of iron, nickel, cobalt, silicon, sodium, potassium and magnesium in an amount such that each element M is not more than 100 ppm by weight, or the total amount of the element M is not more than 350 ppm by weight.

2. A sintered body produced from a niobium powder, which has a specific leakage current index of not more than about 400 pA/(μF·V).

3. The sintered body according to claim 2, which has a specific leakage current index of not more than about 200 pA/(μF·V).

4. A sintered body produced from a niobium powder, said niobium powder having a nitrogen content of at least about 500 ppm by weight and not more than about 7,000 ppm by weight, and having a mean particle diameter of at least about 0.2 μm and less than about 3 μm.

5. The sintered body according to claim 4, wherein said niobium powder has a mean particle diameter of at least about 0.5 μm and less than about 2 μm.

6. The sintered body according to claim 4, wherein said niobium powder has a nitrogen content of at least about 1,000 ppm by weight and not more than about 3,000 ppm by weight.

7. The sintered body according to claim 4, wherein said niobium powder contains as impurity at least one element M selected from the group consisting of iron, nickel, cobalt, silicon, sodium, potassium and magnesium in an amount such that each element M is not more than 100 ppm by weight, or the total amount of the elements M is not more than 350 ppm by weight.

8. The sintered body according to claim 4, which has a specific leakage current index of not more than about 400 pA/(μF·V).

9. The sintered body according to claim 4, which has a specific leakage current index of not more than about 200 pA/(μF·V).

10. A capacitor comprising (i) an electrode, wherein the electrode is a sintered body produced from a niobium powder, (ii) a dielectric formed on the sintered body, and (iii) a counter electrode; said niobium powder having a nitrogen content of at least about 500 ppm by weight and not more than about 7,000 ppm by weight, and having a mean particle diameter of at least about 0.2 μm and less than about 3 μm.

11. The capacitor according to claim 10, wherein said niobium powder has a mean particle diameter of at least about 0.5 μm and less than about 2 μm.

12. The capacitor according to claim 10, wherein said niobium powder has a nitrogen content of at least about 1,000 ppm by weight and not more than about 3,000 ppm by weight.

13. The capacitor according to claim 10, wherein said niobium powder contains as impurity at least one element M selected from the group consisting of iron, nickel, cobalt, silicon, sodium, potassium and magnesium in an amount such that each element M is not more than 100 ppm by weight, or the total amount of the elements M is not more than 350 ppm by weight.

14. The capacitor according to claim 10, wherein said sintered body has a specific leakage current index of not more than about 400 pA/(μF·V).

15. The capacitor according to claim 10, wherein said sintered body has a specific leakage current index of not more than about 200 pA/(μF·V).

16. The capacitor according to claim 10, wherein said dielectric is composed of niobium oxide formed by electrolytic oxidation on the surface of the sintered body.

* * * * *